US005420794A

United States Patent [19]

James

[11] Patent Number: 5,420,794

[45] Date of Patent: May 30, 1995

[54] AUTOMATED HIGHWAY SYSTEM FOR CONTROLLING THE OPERATING PARAMETERS OF A VEHICLE

[76] Inventor: Robert D. James, 13000 Disney La., Silver Spring, Md. 20906

[21] Appl. No.: 83,767

[22] Filed: Jun. 30, 1993

[51] Int. Cl.[6] ......................... G08G 1/01; G06F 15/50

[52] U.S. Cl. ..................................... 364/436; 364/438; 340/991; 340/992; 340/993; 340/932

[58] Field of Search ................... 364/436, 438, 424.02, 364/424.03, 424.04, 444, 449, 565; 340/990, 991, 992, 993, 936, 870.15, 932

[56] References Cited

U.S. PATENT DOCUMENTS

| | | | |
|---|---|---|---|
| 4,804,937 | 2/1989 | Barbiaux et al. | 340/52 F |
| 4,819,174 | 4/1989 | Furuno et al. | 364/444 |
| 5,126,941 | 6/1992 | Gurmu et al. | 364/424.02 |
| 5,128,669 | 7/1992 | Dadds et al. | 340/901 |
| 5,134,393 | 7/1992 | Henson | 340/933 |
| 5,155,689 | 10/1992 | Wortham | 364/460 |
| 5,289,183 | 2/1994 | Hassett et al. | 340/905 |
| 5,315,515 | 5/1994 | Schmitz | 364/424.01 |

*Primary Examiner*—Michael Zanelli
*Attorney, Agent, or Firm*—Joseph J. Zito

[57] ABSTRACT

An automated highway system reduces the data processing requirements on the vehicles and distributes the processing requirements throughout the automated highway system infra-structure. In this system, a vehicle is detected by use of a vehicle on-board transponder. This transponder responds to an omni-directional radio frequency transmission from a highway control facility used by the automated highway system in the vicinity of the vehicle. The highway control facility interrogates the vehicle transponder for identification, destination, and other pertinent travel parameters or user services to route the vehicle, schedule maintenance, provide user services, and so on. Additionally, the highway control facility calculates the location of the vehicle and energizes vehicle mounted actuators to steer, accelerate and brake the vehicle as necessary. The vehicle maintains constant communications with the automated highway system facilities while on the automated highway system highway. The highway control facility maintains a record of the vehicle as it proceeds along the highway by handing the record to the next adjacent highway control facility. The vehicle has a user interface whereby the vehicle's occupant can be informed of road, weather, traffic conditions, other user services, and the user interface unit can communicate through the user vehicle transponder to the highway control facility of a change of travel schedule, change of destination, or other parameter changes. The user interface unit permits communication by voice (microphone and loudspeaker), keypad, and CRT.

18 Claims, 7 Drawing Sheets

X – Transmitter (10)
⊖ – Longitudinal Receiver (20)
⦶ – Lateral Receiver (30)

AUTOMATED HIGHWAY SYSTEM FOR CONTROLLING THE OPERATING PARAMETERS OF A VEHICLE

BACKGROUND OF THE INVENTION

The present invention relates to an automated highway system for controlling the operation of cars travelling thereon. The goal of such highway systems is to provide improved traffic control and higher speed traffic flow.

Various technologies for the automated highway system have been proposed. These technologies include image processing, optical lasers, radar systems, rf detectors, acoustic sensors, and magnetic sensors. These systems and sensors were conceived as installed on automobiles and many of these sensors and detectors contain a high degree of complexity and sophistication. Such systems and sensors are shown, for example, in U.S. Pat. No. 4,962,457 to Chen et al teaching a transmitter installed on a vehicle, in U.S. Pat. No. 5,196,846 to Brokelsby et al teaching a vehicle identification system, and in U.S. Pat. No. 4,052,595 to Erdmann et al teaching an automatic vehicle monitoring system.

However, to maintain stability in close "platoon" formations it is necessary to employ inter-vehicle communications. Some systems, such as PATHs magnetic nails, are shown in U.S. Pat. No. 1,361,202 to Minavitel teaching an imbedded metallic guardrail, and in U.S. Pat. No. 5,126,941 to Gormu et al teaching a vehicle guidance system. Such PATHs magnetic nails take advantage of roadway vehicle cooperation to simplify the sensor requirements in controlling the vehicles. Others install radio equipment above the roadway to communicate with vehicles, such as shown in U.S. Pat. No. 5,128,669 to Dodds et al, which relates to communicating information by radio.

Other attempts are also known in the prior art. In U.S. Pat. No. 5,196,846 to Brockelsby, a road side interrogator and transponder is taught for moving vehicle identification. In U.S. Pat. No. 5,182,555 to Summer, a traffic congestion communication system is shown. U.S. Pat. No. 5,164,732 to Brockelsby teaches a roadway interrogator antenna system. U.S. Pat. No. 5,134,393 to Henson discloses roadway positioned detectors/processors. In U.S. Pat. No. 5,128,669 to Dadds, overlapping transponders are taught. U.S. Pat. No. 5,126,941 to Gurmu teaches guiding vehicles with roadside controls. U.S. Pat. No. 4,968,979 to Mizuno teaches buried roadway vehicle detection. U.S. Pat. No. 4,962,457 to Chen discloses roadway installed site specific information and communications. U.S. Pat. No. 4,789,941 to Nunberg teaches ultrasonic computerized vehicle classification. In U.S. Pat. No. 4,591,823 to Horvat, vehicle surveillance is taught. U.S. Pat. No. 4,361,202 to Minovitch teaches smart cars with roadway transponders. U.S. Pat. No. 4,350,970 to von Tomkewitsch teaches routing transmitters for roadway to vehicle transmission. U.S. Pat. No. 4,052,595 to Erdmann discloses transducers to vehicle monitoring. U.S. Pat. No. 4,023,017 to Ceseri discloses monitored roadways. Finally, U.S. Pat. No. 3,920,967 to Martin teaches a computerized roadway monitor at intersections.

Previously conceived automated highway system designs have been based on the above-discussed types of systems that contains sensors and processors that require communication between vehicles, or vehicles that are capable of acting alone. This approach has proven very complicated and expensive, and would require a relatively long time to develop.

It is therefore a problem in the art to reduce the necessary processing and the necessary position sensing from the vehicle, and to distribute it throughout the highway infra-structure.

SUMMARY OF THE INVENTION

An automated highway system according to the present invention reduces the data processing requirements on the vehicles and distributes the processing requirements throughout the automated highway system infrastructure. In this system, a vehicle is detected by use of a vehicle on-board transponder. This transponder responds to a microwave or radio frequency transmission from a highway control facility used by the automated highway system in the vicinity of the vehicle. The highway control facility interrogates the vehicle transponder for identification, destination, and other pertinent travel parameters or user services to route the vehicle, schedule maintenance, provide user services, and so on. Additionally, the highway control facility calculates the location of the vehicle and energizes vehicle mounted actuators to steer, accelerate and brake the vehicle as necessary. The vehicle maintains constant communications with the automated highway system facilities while on the automated highway system highway. The highway control facility maintains a record of the vehicle as it proceeds along the highway by handing the record to the next adjacent highway control facility. The vehicle has a user interface whereby the vehicle's occupant can be informed of road, weather, traffic conditions, other user services, and the user interface unit can communicate through the user vehicle transponder to the highway control facility of a change of travel schedule, change of destination, or other parameter changes. The user interface unit permits communication by voice (microphone and loudspeaker), keypad, and CRT. The keypad is capable of sending alphanumeric symbols using a system as shown in U.S. Pat. No. 4,427,848 to Tsakanikas, which relates to an alphanumeric data transmission system.

Furthermore, the vehicle mounted-transponder facility can maintain a record of the vehicle maintenance, and perform self-diagnostics of steering, acceleration, braking responses at different velocities. Such self-diagnostics also will monitor fuel, oil pressure, and temperature, and the monitor will report periodically the required maintenance procedures.

In the event of a communication failure, a mechanical emergency, or an emergency request from the user interface, the vehicle transponder will initiate switching to specific back-up devices and communicate to the smart highway the emergency. The vehicle transponder will also perform an orderly shutdown of the vehicle if all back-up procedures have been exhausted.

The invention will be described in greater detail below with reference to an embodiment which is illustrated in the drawings.

DETAILED DESCRIPTION OF THE PREFERRED EMBODIMENT

The automated highway system according to the present invention employs a smart highway infrastructure which communicates with and controls vehicles travelling on it. These vehicles are "dumb cars". The "dumb cars" merely carry basic instrumentation which is required to operate the vehicles and to be controlled by the "Smart Highway TM" system infrastructure.

The aforesaid basic instrumentation carried by the vehicles includes the actuators required to steer, accelerate, and brake the vehicle, and the transponder used to communicate with the highway infra-structure. The aforesaid "highway infra-structure" contains transmitters, receivers, and processors to control the position and velocity of the vehicles travelling along the automated highway system. Additionally, the highway infra-structure maintains and updates files of the vehicles on the roadway and passes the file to the next processor along the roadway.

The transponder can have a single operating frequency, or it can have more than one operating frequency. In the preferred embodiment, only a single operating frequency is used, which is advantageous in that fewer components are required. However, it is contemplated as being within the scope of the present invention to employ two or more operating frequencies, for example one frequency could be used in the localization process, and another signal could be used for other communications.

Figure 1:
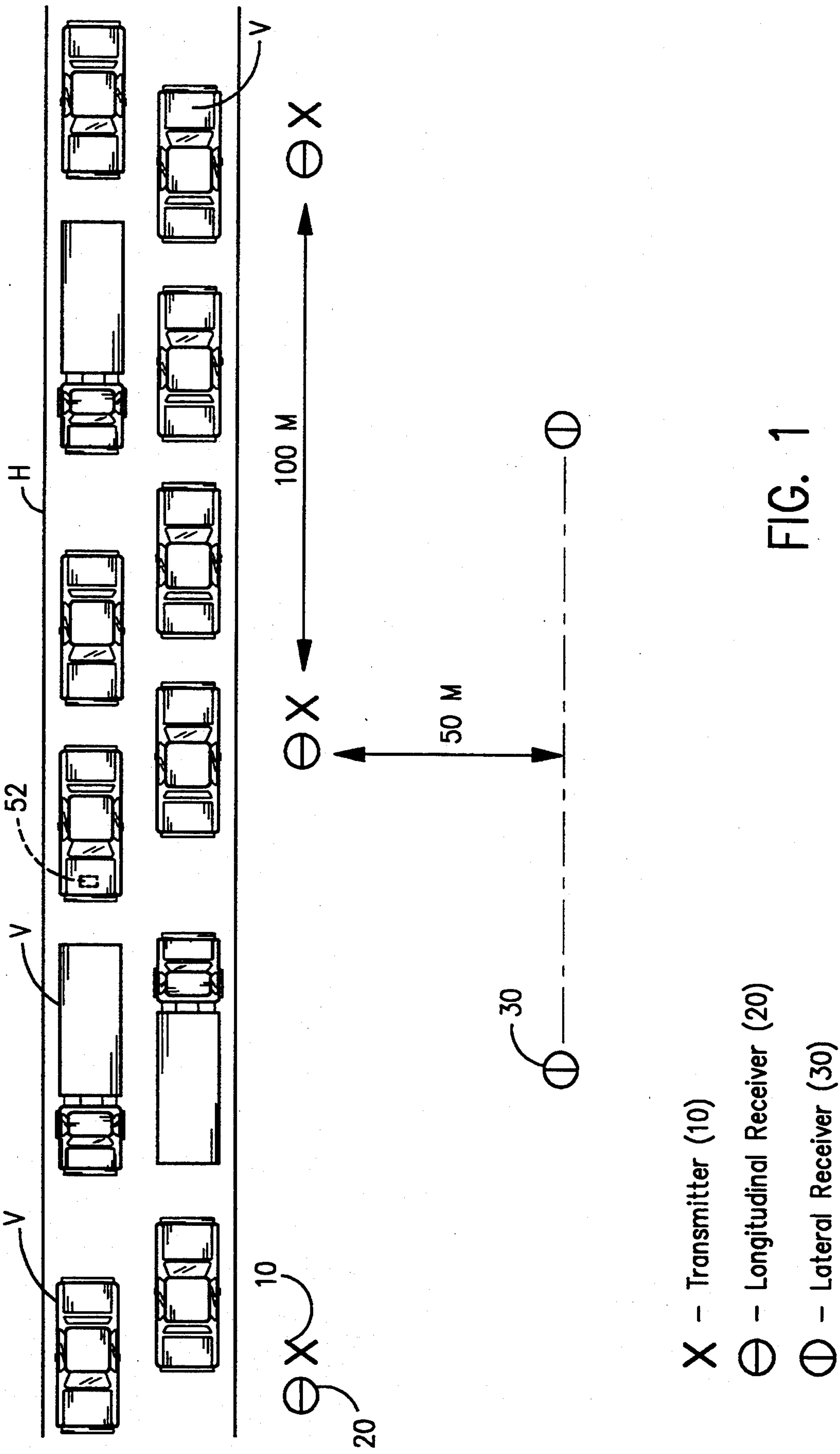
FIG. 1 is a diagram illustrating a transmitter/receiver layout for an automated highway system according to the present invention.

Referring to FIG. 1, which shows a transmitter/-receiver layout according to the present invention, a highway H carries vehicular traffic which includes a plurality of vehicles V including various cars and trucks. The automated highway system according to the present inventions also includes a plurality of transmitters 10, longitudinal receivers 20, and lateral receivers 30.

The "highway infra-structure" also includes a plurality of processors 70 (shown in FIG. 4) that control and communicate through transmitters to the transponder on the vehicles and receives the communications from the vehicle, as discussed further hereunder.

The transmitters 10 shown in FIG. 1 send out addresses and commands to the vehicle transponders. The vehicle transponders 52 (one of which is shown in phantom outline on a vehicle V in FIG. 1) detect and acknowledge the transmission from the transmitters 10. The delay between the actual time of the transmission burst from one of the transmitters 10 and the time one of the vehicle transponders 52 receives that burst allows the local highway processor to determine the location of the vehicle.

The foregoing assumes that each of the vehicle transponders 52 substantially immediately or instantly acknowledges the received burst. However, if the vehicle transponders 52 require a fixed delay time between receiving a burst and transmitting the acknowledgement, such fixed delay time can be subtracted out of the measured delay time so that the actual signal travel time is used in any subsequent calculations.

The vehicle transponder burst from the vehicle transponders 52 is received by multiple receiver antennas (i.e., of the longitudinal receivers 20 and the lateral receivers 30). The antennas of the longitudinal receivers 20 and the lateral receivers 30 are directional (as their name implies) so as to receive signals along the highway and maintain a redundant coverage pattern. Some of the antennas are directed to receive signals lateral to or across the highway and to reject signals longitudinal to or along the highway. Other antennas are directed to receive signals longitudinal to the roadway.

Figure 2:
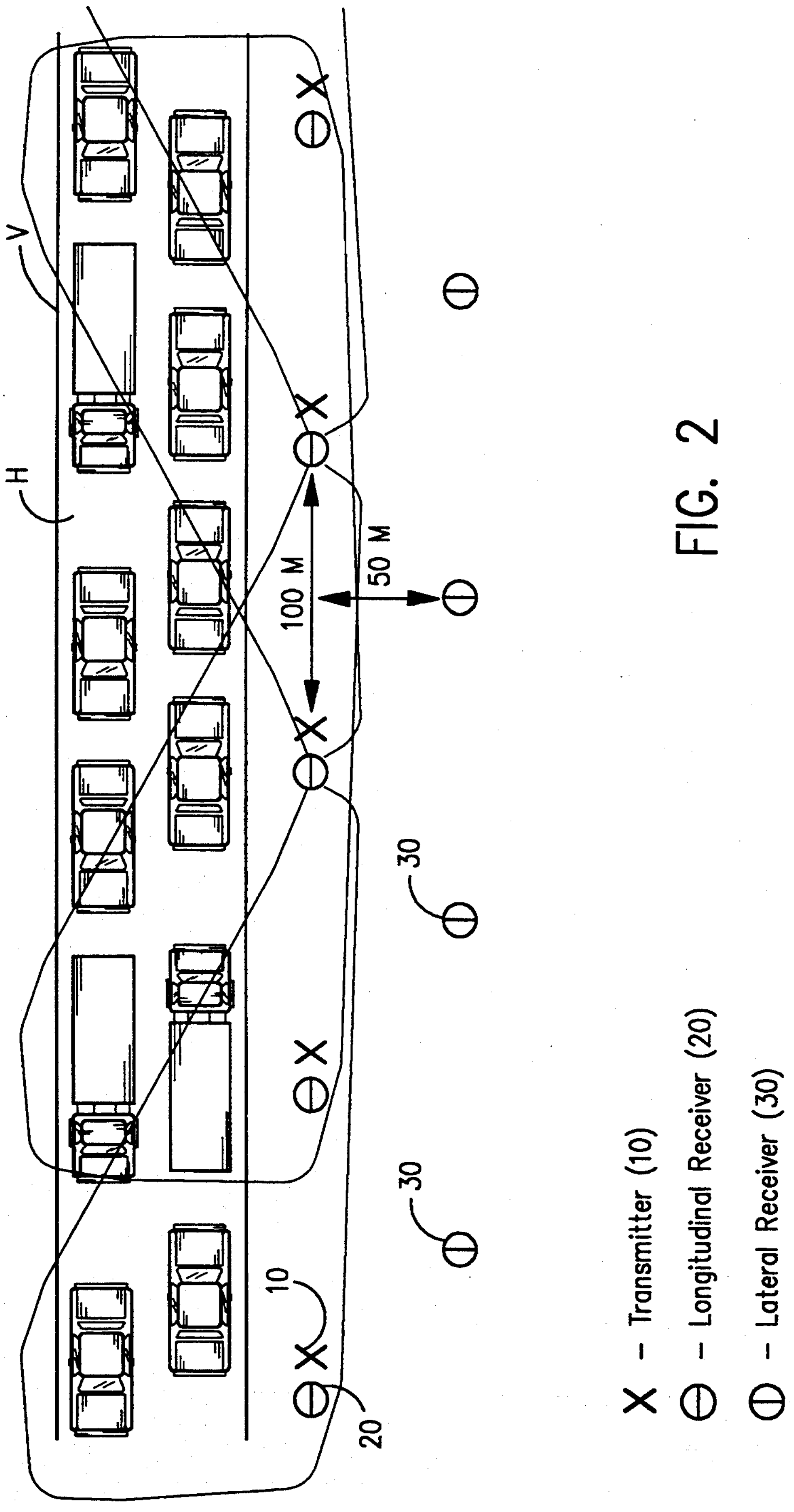
FIG. 2 is a diagram illustrating an example of a longitudinal receiver beam pattern for an automated highway system according to the present invention.
Figure 3:
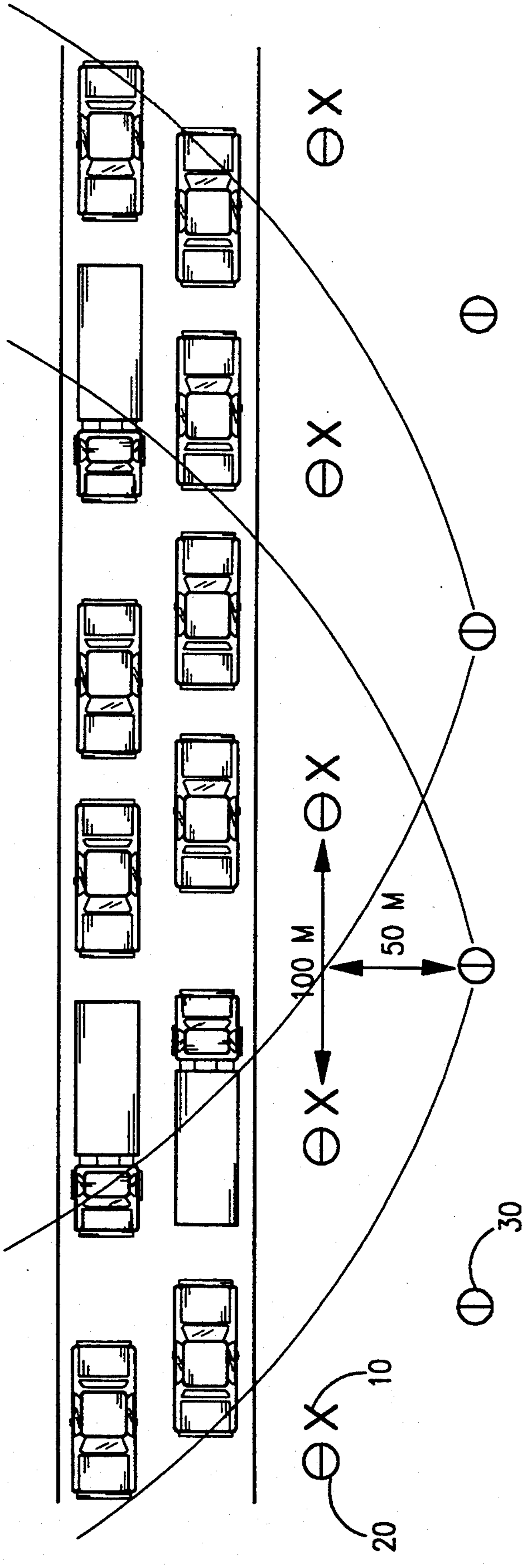
FIG. 3 is a diagram illustrating an example of a lateral receiver beam pattern for an automated highway system according to the present invention.

As shown in FIG. 1, transmitters and longitudinal receivers are co-located at 100 meter intervals along and to the side of the highway. Examples of possible layouts are shown in FIGS. 1, 2, and 3, and any other layouts which achieve the desired results are contemplated as being within the scope of the present invention as well. It would be within the ambit of one having skill in the art to which the present invention pertains to arrive at other arrangements as well, and accordingly FIGS. 1, 2, and 3 are merely exemplary of the present invention.

In FIG. 1, at 50 meters away from the highway also at 100 meter intervals and offset by 50 meters, are located lateral receivers 30. When the transmitter rf burst occurs, the vehicles V on the highway H respond with a microwave or rf burst acknowledgment. The longitudinal receiving antennas 20 respond to signals from along the highway H, and these signals are delayed by the distance the signal must travel (see, for example, FIG. 2). Simultaneously, the lateral receiving antennas respond to signals across the highway and are delayed by the distance the signal must travel (see, for example, FIG. 3 ).

Each vehicle transponder transmits a unit identification with the microwave or rf burst. The receiver reports the time of signal reception to the processors along with the transponder identification code. The processor associated with the transmitter identifies the transponder identification code and calculates the distance to each of the responding receivers from the transponder, thereby locating the vehicle on the highway map.

The signal reception coverage for the arrangement of FIG. 1 is schematically illustrated in FIGS. 2 and 3. Multiple receivers allow the processor or processors 70 to increase the accuracy of the vehicle location fix, since some of the receivers fix the location of the vehicle longitudinally, while other receivers fix the location of the vehicle laterally on the highway. One knowledgeable in the position-detecting arts would readily understand the mathematics of determining the locations involved and could readily formulate an algorithm for implementation by the processor(s) 70 to accurately determine the position of the vehicle V.

Existing techniques can be used for the above-noted position-detecting. An example of such an existing technique is Kalman tracking, which is a multi-target tracking technique. Also, vehicle control algorithms are known for generating vehicle guidance commands, and development and implementation of such vehicle guidance commands would be within the ambit of one having skill in the remote control arts and the automotive control arts.

The vehicles V therefore need not stay in particular lanes on the highway H, since the vehicles V always are located on a map in the local one of the processors 70. Therefore, a three lane capacity roadway can be run with one, two, or three lanes to maximize safety and vehicle throughput. It is noted that the vehicles V need not all run in the same direction of the highway H, for example in a three lane highway one of the three lanes could bear traffic travelling in a direction which is opposite to the other two lanes. That is, vehicles can be in bi-directional flow. Higher numbers of lanes can also be accommodated according to the present invention, for example four or more lanes can also be accommodated.

Vehicles entering the highway respond to the transmitted rf burst from the transmitters 10 with their identification code and are fixed in position by the processor 70. This new transponder identification code is verified by a central processor (not shown in FIG. 1) via a wide area network (WAN) of the automated highway system according to the present invention. The automated highway system according to the present invention includes this central processor in an Advanced Traffic Management System (ATMS) controller (not shown in FIG. 1). The vehicles V then move onto the highway and are tracked. The automated highway system according to the present invention, in order to maintain safe traffic conditions and high throughput, requires and obtains vehicle location accuracy in the order of about ten centimeters.

The above-mentioned vehicle instrumentation includes actuators to control steering, actuators to control acceleration, and actuators to control braking. Such devices are known, and use of such known devices as well as any other devices are contemplated as being within the scope of the present invention. The above-noted actuators are activated and controlled by a vehicle processor 50 (shown in FIG. 4).

The commands received at the vehicle processor 50 cause the actuators to be activated. This activation then changes the travel parameters, namely the direction steered, the acceleration, and the braking. The commands are received at a rate that allows updating at a one (1) kilohertz rate. This high speed updating, along with optional mechanically integrated adjustments, allows for smooth vehicle operation and fast response time to changing conditions. The vehicle processor 50 receives commands from the vehicle transponders 52 and initiates response to the vehicle transponder. To prevent system communication failure, the transponder 52 has a back-up unit transponder 54 (shown in FIG. 4). Additionally, the vehicle processor 50 performs vehicle maintenance checks and vehicle performance logging (see FIG. 4), and accepts requests and commands from a user interface unit 62 and sends replies to the user interface unit.

Many previous studies have designed actuators to control the vehicle functions referred to above. The key elements to examine in the actuator design are the update rate at which the vehicle functions can be controlled and the size of the incremental adjustments that can be made. In the past, developers have tried to emulate the capabilities of a person in their actuator designs. However, in order to get the increased performance required and the comfort expected from an automated highway system, the responses in the actuators must be at least an order of magnitude better than that of a person. Updating the navigation commands at a 1,000 Hz rate to mechanically integrated controls will allow for smooth steering, acceleration and braking controls, rather than incremental adjustments. The net result will be a smoother ride with a faster response time and better lane following.

According to the present invention, the complicated vehicle sensors of the prior art are replaced with a relatively simple transponder-type system that, in addition to performing the vehicle/roadside communications, is used to accurately locate the position of the vehicle in the roadside processors. The transponder system can locate and track the vehicle both laterally and longitudinally to better than 10 cm accuracy. The transponder 52 also will be used to receive navigation instructions from the roadside processor. Combining the communication and vehicle positioning system simplifies the vehicle design while providing very accurate positional information that the other detection systems of the prior art are not able to achieve.

Thus, the vehicle will be able to maintain a two way communications link with the roadside infrastructure at all times. The transponder 52 of the vehicle V will transmit information such as diagnostic status, user requests and vehicle ID. The roadside will transmit various information such as vehicle position, weather/road conditions, estimated time of arrival (ETA), and request responses. If communication is lost, transition to a back-up transponder can be made or a controlled shutdown of the vehicle can be performed.

The vehicle transponder 52 performs the mobile portion of the vehicle location process by receiving the roadside transmission, delaying a known time, then transmitting its identification code and responses to the commands. The vehicle transponder maintains continuous communication on the order of 1000 Hz with the roadside processor 70 and passes various information such as position adjustment commands, weather, road conditions, time to the assigned exit, and other user services and responses such as maintenance, records, and response measurements. In the event of a communication failure, the vehicle processor 50 will attempt a change to the back-up processor and, failing that, will perform an orderly vehicle shutdown. The vehicle processor 50 updates the actuators at a 1 kHz rate to maintain smooth vehicle operation and quick response to sudden changes in road or traffic conditions.

Figure 4:
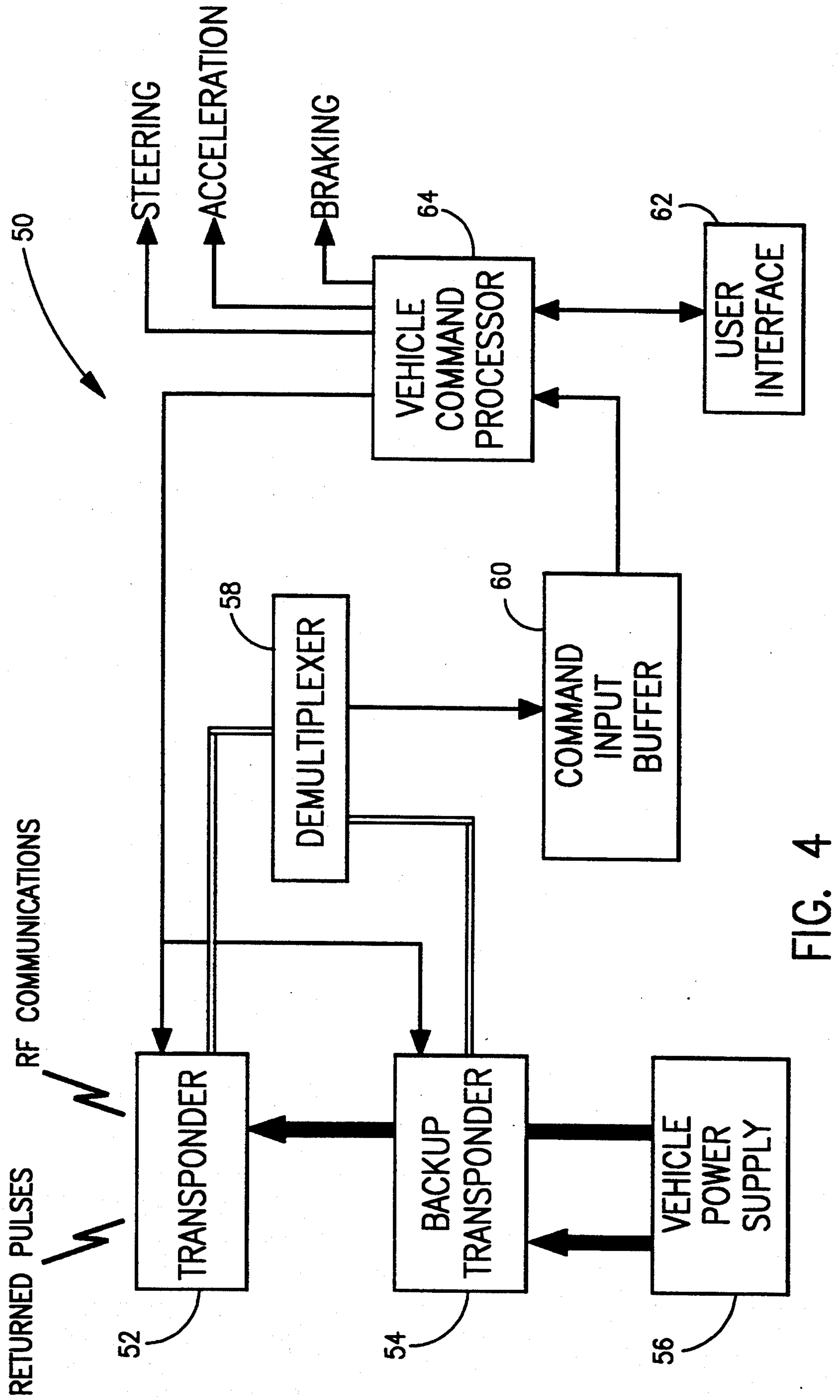
FIG. 4 is a diagram schematically illustrating a vehicle communications processor for an automated highway system according to the present invention.

The vehicle processor 50 is provided in each vehicle V for interfacing with the transponder 52 and the above-discussed actuators. The user interface 62, as shown in FIG. 4, is provided for the vehicle processor 50, the user interface 62 being a human-machine interface unit. It communicates with a vehicle command processor 64 via remote control or hardwire cabling, as convenient for the manufacturer. The data is received by the vehicle command processor 64, which is preferably a microprocessor, via a UART device and is stored in RAM. A program in ROM in the microprocessor 64 causes the data to activate one or more of the output devices (these commands being indicated by output arrows from the processor 64 in FIG. 4). Such output devices can also include a loudspeaker or a CRT display unit.

As shown in FIG. 4, a vehicle power supply 56 of the vehicle V supplies power to both the back-up transponder 54 and the transponder 52. The transponder 52 can receive input signals and produce output pulses as indicated in FIG. 4, and is connected to receive input signals from the vehicle command processor 64.

The transponder 52 also has two-way communication with a demultiplexer 58. The signals received by the transponder 52 and sent to the demultiplexer 58 are demultiplexed and then supplied to a command input buffer 60.

The command input buffer 60 is connected to output the received commands to the vehicle command processor 64, as shown in FIG. 4. The back-up transponder 54 also has two-way communications with the demultiplexer 58.

The user interface 62 can include an alphanumeric keypad or a microphone for receiving speech commands. Responses to the output commands and user requests to the automated highway system are entered by the alphanumeric keypad or speech command to the microphone of the user interface 62. If voice commands are used, they are converted to digital commands by an audio-to-digital converter and word recognition algorithm, as is known in the art. The requests and commands are formatted by a microprocessor (not shown) contained in the user interface 62 and then forwarded to the vehicle command processor 64 via the UART and data link. Keypad requests and commands are converted from tone to digital as described in U.S. Pat. No. 4,427,848 referenced above, then formatted by the microprocessor of the user interface 62 and then forwarded to the vehicle command processor 64.

FIG. 4 is an example of a communication processing system according to the present invention. As noted above, the system includes two transponders 52 and 54, of which one is normally on line, while the other performs as a back-up unit. The back-up unit assures the continuity of communications. The transponder receives queries and communications from the roadside transmitters and responds with the identification code and other communications. Commands are received using an identification code as an address. The commands are forwarded to the command input buffer 60 via the demultiplexer unit 58. The command input buffer acts as an elastic memory allowing the vehicle command processor to operate on the commands, one at a time. The processed commands are routed to the appropriate actuator. Requests from the user interface 62 are encoded and forwarded to the online transponder for transmission. Replies to queries are directed to the user interface 62.

The vehicle power system 56 supplies power which is filtered and regulated to supply smooth DC to the vehicle communication/processor.

The user interface unit 62 can be an audio-based data entry system as discussed above, or a keypad/video monitor data entry system. In one embodiment, the user interface unit 62 could accept verbal commands and respond both with verbal answers and a video display. A touch pad could accept alphanumeric commands, as well (see U.S. Pat. No. 4,427,848, disclosing an Alphabet Phone TM). The operator could in this manner communicate with the ATMS controller and request information about road conditions, traffic, weather, or other user services. Responses would be returned to the CRT or the loudspeaker. The queries and replies are sent and received via the vehicle transponder 52 to the local processor and then to the ATMS wideband network. In the event of an emergency, the operator could request assistance and bring the vehicle V to an orderly shutdown.

The automated highway system architecture design includes a series of transmitters and receivers that are highly overlapped and locally controlled by a series of networked processors. The system preferably contains three times the number of transmitters, receivers and processors that are needed for minimal operation. This is done to allow graceful degradation of the system as various components fail, and to allow for even greater performance when all components are working. This approach uses a "multi-static" transmitter/receiver layout where the transmitters and receiver are not necessarily co-located. There are multiple receivers for each transmitter and each receiver can process the returns from multiple transmitters. This overcomes the line-of-sight problem or shadowing problem inherent in many systems by being able to see the vehicle from many directions.

The transmitters are preferably omni-directional to excite the vehicle transponders 52 on all sides and of sufficient power to cover approximately a 300 m radius reliably in all weather conditions. Since the vehicle transponders 52 are active devices, the transmitter does not have to be very powerful. Transmitters are spaced approximately 100 m apart and transmit coded pulses to identify from which transmitter the pulse emanated.

There are two types of receivers in the system. One set of receivers are designed to receive pulses longitudinally along the roadway and another set are designed to receive pulses laterally. These are the longitudinal receivers 20 and lateral receivers 30 shown in FIGS. 1-3. Since the receivers 20 and 30 are spatially distributed, receivers of both types contain both lateral and longitudinal information. These are one possible type of layout, which is merely exemplary, and other layouts are also possible, as discussed hereinabove. The local processor 70 preferably optimally extracts this information. The longitudinal sensors are co-located with the transmitters along the roadway and the lateral sensors are back approximately 50–100 m from the roadway (see FIG. 1). As discussed hereinabove, the coverage patterns for the lateral and longitudinal receivers are shown in FIGS. 2 and 3.

The receivers measure the time delay between the arrival of the transponder pulse and the arrival of the transmitter pulse. This time difference and the transponder pulse level are tagged with the vehicle ID, the transmitter ID, the receiver ID and any other ancillary information and sent to the local processor 70. The processor 70 calculates the vehicle position, tracks the vehicle, and determines any navigation adjustment the vehicle V should make. These navigation adjustments and any other information are sent to the transmitter to encode and send to the vehicle V.

Figure 5:
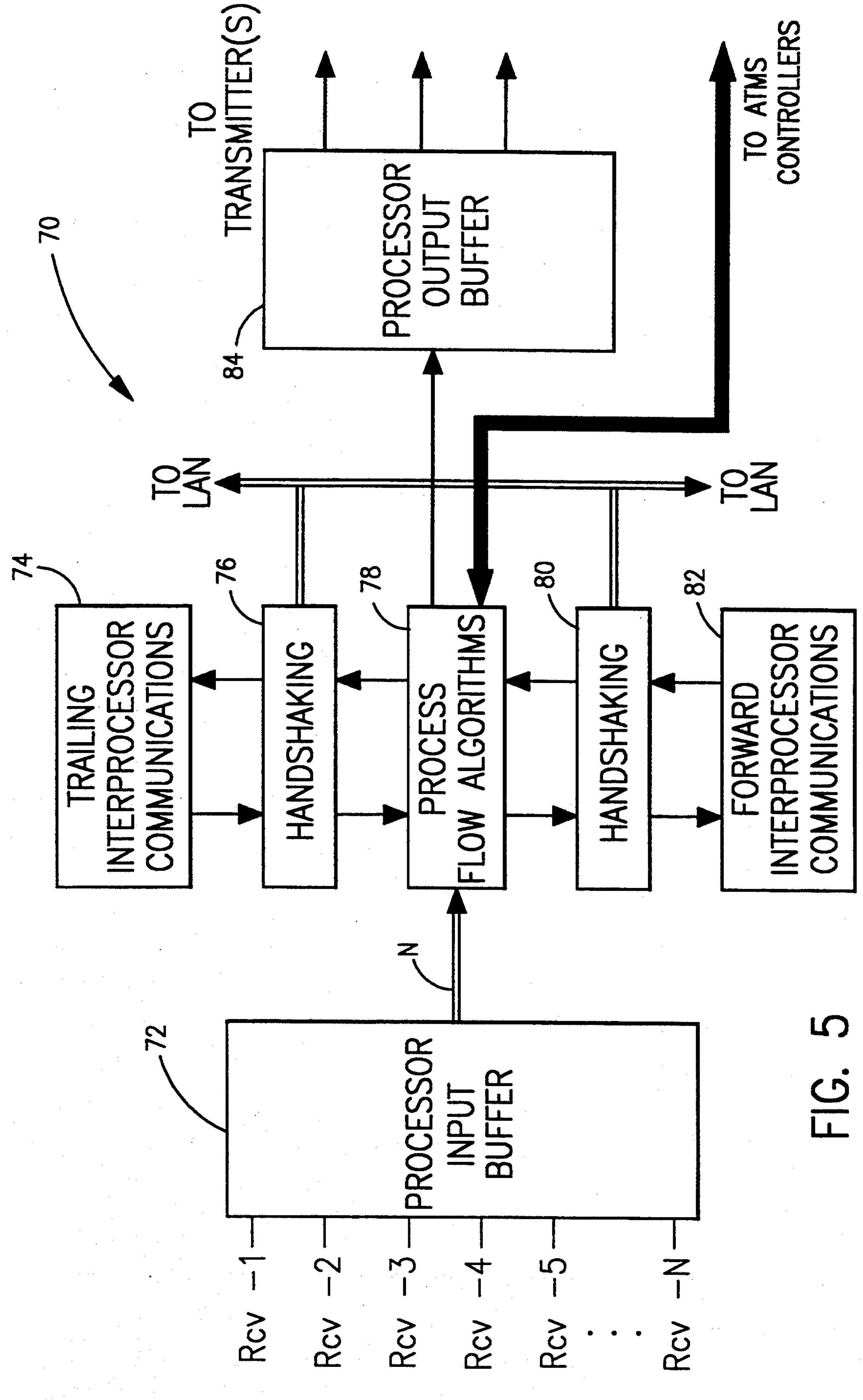
FIG. 5 is a diagram schematically illustrating a local communications processor for an automated highway system according to the present invention.

FIG. 5 schematically depicts a local processor 70. The aforementioned decision-making and necessary calculations therefor are performed in the above-noted distributed network of interconnected local processors 70. Each processor 70 maintains communications with local receivers, performs vehicle tracking, responds to service requests, performs handshaking with other processors and communicates with the Local Traffic Management Center. Each processor 70 controls one transmitter and six to twelve receivers. The processor 70 has, in its memory (EPROM or other programmable memory), a local map which specifies the roadway edges and the transmitter location with respect to the receivers. The map is accurate to twenty centimeters for roadway edges and better than 5 cm for the transmitter and receiver locations and extends 500 meters on either side of the processor. Received signals enter the system through the input buffer and are then processed as shown in the flow chart of FIG. 6.

In FIG. 5, the processor 70 includes a processor input buffer which receives as inputs a plurality of received signals Rcv-1, Rcv-2, Rcv-3, ..., Rcv-N. The buffer 72 supplies its output to a processor (or processor portion) 78 which processes flow algorithms, which processor 78 can be a known type of microprocessor device. The processor 78 performs handshaking as shown by element 76 with a trailing interprocessor communications device 74. The processor 78 also performs handshaking as shown by element 80 with a forward interprocessor communications device 82. The processor 78 has two-way communications with the ATMS controller as indicated in FIG. 5, and the handshaking elements 76 and 80 communicate with a local area network (LAN). As shown in FIG. 5, the processor 78 supplies an output to the processor output buffer 84, which in turn produces a plurality of outputs to transmitters.

Each local processor receives communications from 6 to 12 receivers through an input buffer. The processing algorithms select the path for the data. Vehicle files of those leaving the area are forwarded through the forward inter-processor to the next processor 70 downstream of the traffic. Vehicle position information is processed to formulate vehicle actuator commands, and is then routed to the processor output buffer for transmission. Requests for information are routed to the ATMS controller via the wide area network. New vehicle files are received from the trailing inter-processor communications 74 are moved to memory for revision as necessary.

As discussed above, the vehicle position is determined, the road, traffic, and weather conditions are factored into the vehicle track, the actuator commands are determined and encoded, the command is assembled and forwarded to the output processor for transmission. Once an ideal path for vehicles is determined, continuous receiver data can be processed. The processing flow consists of localizing the vehicles, tracking the vehicles, error estimation, and a corrective action determination. New vehicle information enters through the network to the trailing processor 74, and information regarding cars leaving the area are forwarded to the network via the forward processor 82.

The local processor localization algorithm uses the time delay between reception of the transmitter pulse and the vehicle transponder acknowledge pulse. The time difference defines an ellipse where the transmitter and receiver are at the foci. Multiple receivers produce multiple ellipses with a crossing at the vehicle location. Algorithms that use the ellipses crossing method determine position and define areas of uncertainty. The areas of uncertainty would be lateral and longitudinal error. Different vehicle response characteristics such as size and shape of vehicles (cars versus trucks), can be combined to determine vehicle spacing and the control response needed for each vehicle V.

Another way of determining vehicle location is the hyperbola crossing method, wherein instead of using the time difference between reception of the transmitter pulse and the vehicle transponder acknowledge pulse, it uses the arrival time differences of the transponder signal between pairs of receivers. In the hyperbola crossing method, each pair of receivers defines one hyperbola, and the location of a vehicle is at the intersection of hyperbolas. Use of N receivers can produce, if desired, $(N-1)!$ hyperbolas (in this mathematical notation, the symbol ! means "factorial").

The processor 70 must schedule time to service requests from all sources. For example, decision algorithms to service such requests may include: What if one or more tracks are lost? When should spacing be increased? When should processors be shut down? When should the service be taken off-line? When should the ATMS Controller be notified of failure?

Other requests can include, for example, change of destination, desired rest stops, or notification of mechanical problems. Vehicles are to perform self-diagnostic checks in order to maintain acceptable levels of operation. The routine vehicle maintenance such as oil changes, tune-ups, tire replacements, and brake maintenance must be monitored and reported to the system. When a vehicle response becomes sluggish, or the driver fails to maintain the routine maintenance schedule, the driver is instructed to service the vehicle. Failure to improve the vehicle response bars the vehicle from the highway system.

To efficiently transfer vehicle information from processor to processor, a network with appropriate handshaking (such as those networks already well known in the art) is provided. To overcome possible processor failures, handshaking with three processors forward and with at least three trailing are required. Interprocessor communications must contain at the minimum: a vehicle code list, previous track information, vehicle specific information, and vehicle track verification. If a processor fails, information is rerouted to the next processor in the forward direction. Additional communication is available between the processor and the automated highway system central computer via the Advanced Traffic Management System (ATMS) Network.

One big advantage to the ATMS Manager is that when transition is made to the automated highway system, the manager will know when a vehicle enters the automated highway system and at what exit the vehicle gets off. This serves to adjust flow controls on arterials well in advance of changing environments to optimally handle upcoming situations. The controller is linked to each processor and constantly advised of any maintenance needs or emergency situations and automatically directs help as needed. The ATMS controller also is in charge of the entrances and exits to the automated highway system. The controller provides the processors with any needed information such as road conditions and perimeter breaches.

Figure 6:
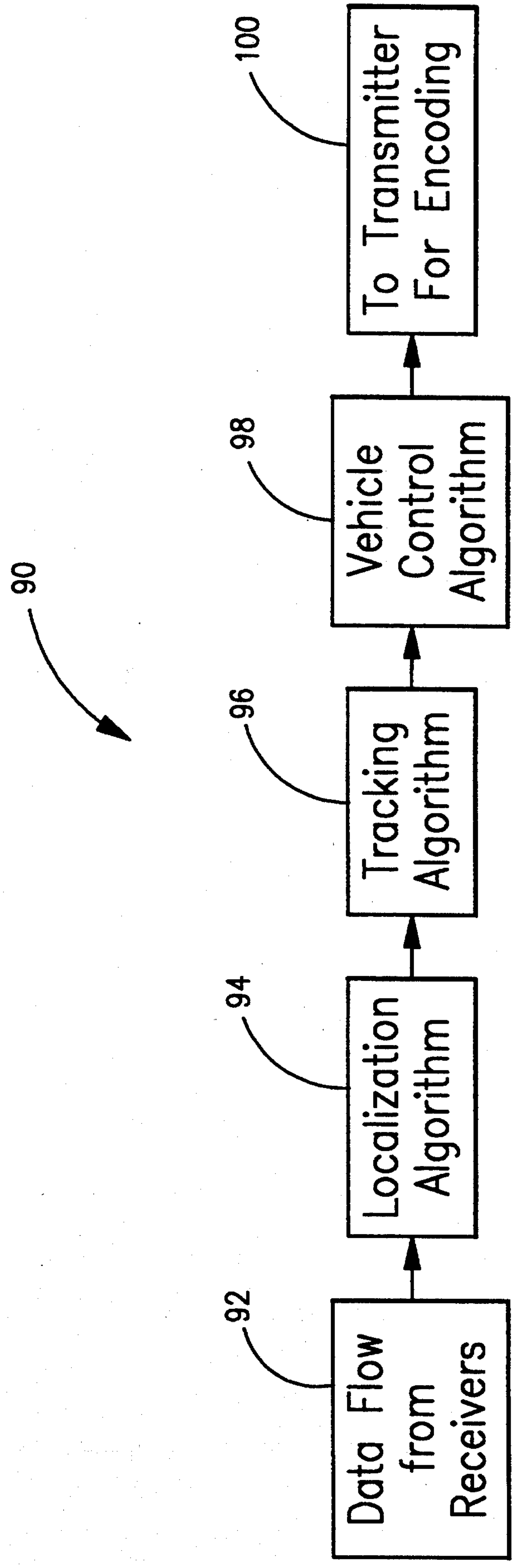
FIG. 6 is a processing flow diagram, or flow chart, for an automated highway system according to the present invention.

FIG. 6 is a flowchart illustrating the process flow of the processor 70 of FIG. 5. Data is received as indicated at block 92. Received data is first processed to determine the vehicle position, as indicated at block 94. The tracking algorithm, as indicated at block 96, compares the actual track of the vehicle V with the hypothetical track of the vehicles on that section of the highway H. The vehicle control algorithm, as indicated at block 98, calculates the minimum correction to move the vehicle V back to within the tolerances of the hypothetical track. The correction commands are forwarded to the processor output buffer for encoding and transmission, as indicated at block 100.

Figure 7:
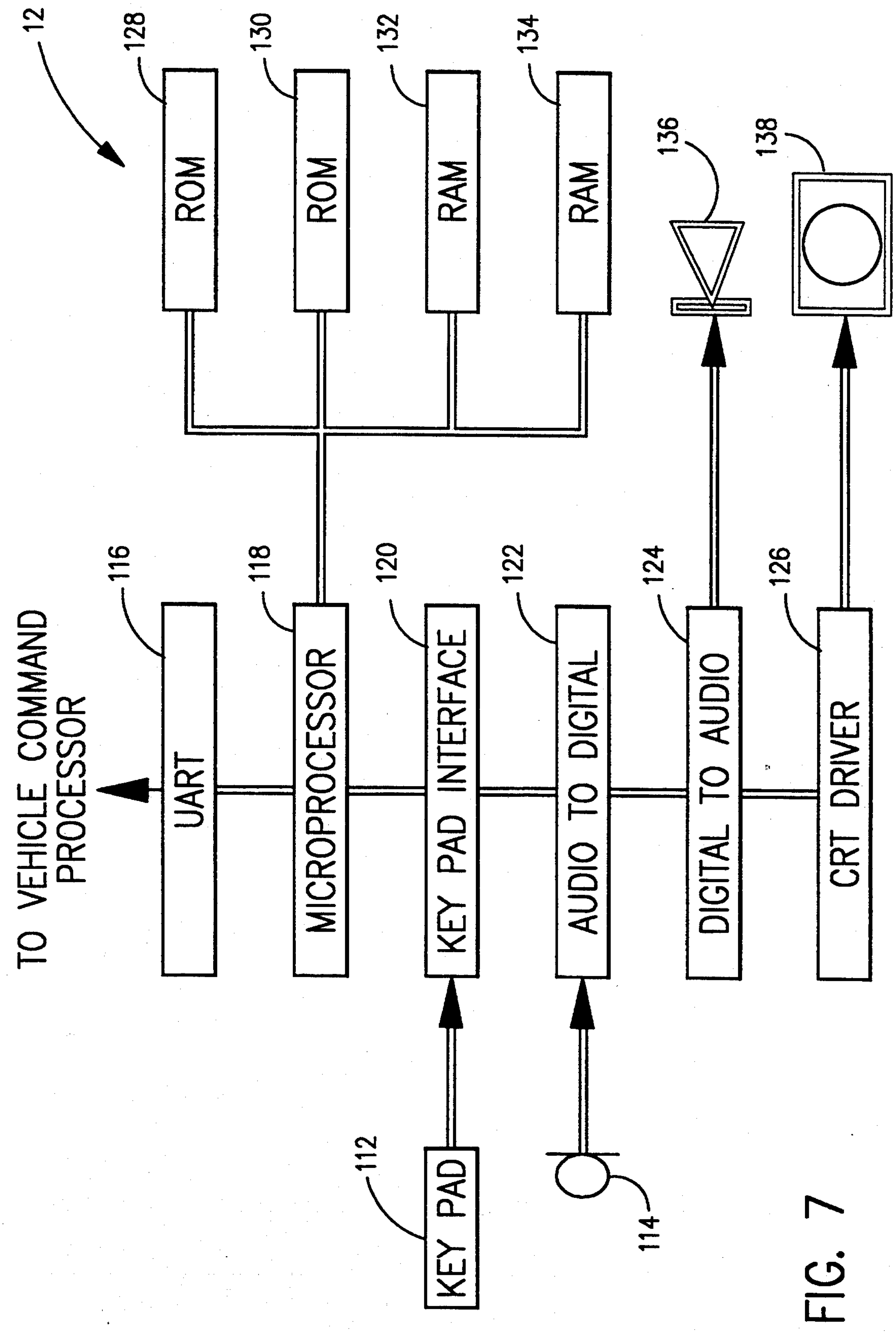
FIG. 7 is a diagram schematically illustrating a user interface for an automated highway system according to the present invention.

FIG. 7 illustrates details of the preferred embodiment of the user interface 12. As noted above, the interface 12 is a man-machine interface unit. Information from the operator can be sent into the system by a keypad 112 or a microphone 114. Output from the unit is displayed on a CRT 138 or spoken through a loudspeaker 136. The keypad 112 generates DTMF tones which are interpreted at the key pad interface 120 as alphanumeric symbols using a device such as that taught by the above-noted U.S. Pat. No. 4,427,848, which teaches a system of communications using the keypad interface, and these DTMF tones are then forwarded to the microprocessor 118. The microphone signals are converted to digital equivalents by the audio to digital converter 122 and routed to the microprocessor 118 for encoding and forwarding to the vehicle command processor. The user interface 12 is used to request information from the highway infra-structure and receive the answers; the user interface can be used to declare an emergency and to automatically shutdown the vehicle. Data forwarded to the microprocessor 118 is operated on by the programming in the ROM (elements 128 and 130 in FIG. 7). The RAM (elements 132 and 134 in FIG. 7) is used as storage for incoming and outgoing messages and data. The microprocessor 118 communicates with a UART 116, which in turn communicates with the vehicle command processor.

As shown in FIG. 7, the device 12 also includes a digital to audio converter 124 to supply signals to the speaker 136, and a CRT driver 126 to supply an output to the CRT 138.

It will be understood that the above description of the present invention is susceptible to various modifications, changes and adaptations, and the same are intended to be comprehended within the meaning and range of equivalents of the appended claims.

What is claimed is:

1. An automated highway system for controlling the operation of a plurality of vehicles travelling thereon, each vehicle carrying an active transponder thereon, comprising:
- a plurality of transmitters for supplying signals to a transponder carried by one of the vehicles;
- a plurality of receivers for receiving signals produced by the transponder carried by one of the vehicles;
- processing means connected to said plurality of transmitters and to said plurality of receivers, for determining a longitudinal and lateral position of one or more of the vehicles, wherein each of the vehicles includes actuators for controlling vehicle operating parameters, wherein said vehicle operating parameters include steering and speed, and wherein said processing means supplies control signals via said plurality of transmitters to said actuators.

2. An automated highway system as claimed in claim 1, wherein said processing means contains a stored map, and maintains a location of each of the vehicles on said map.

3. An automated highway system as claimed in claim 1, wherein said processing means keeps records of individual ones of the vehicles and schedules maintenance for each vehicle, tests vehicle response to commands, and adjusts vehicle spacing accordingly.

4. An automated highway system as claimed in claim 1, wherein said processing means comprises redundant distributed architecture communicating via a network.

5. An automated highway system as claimed in claim 4, wherein said network has multiple communication modes.

6. An automated highway system as claimed in claim 1, wherein communication between said plurality of transmitters and receivers and with the vehicle transponder is by rf burst transmission.

7. An automated highway system as claimed in claim 1, wherein the vehicle transponders include a transponder processing means for performing communication, decoding and encoding commands, and for controlling the actuators to control the path and velocity of the vehicle.

8. An automated highway system as claimed in claim 7, wherein said transponder processing means is updated at short time periods by said plurality of transmitters, in order to ensure smooth transmissions and mechanically integrated control of steering, acceleration, and braking.

9. An automated highway system as claimed in claim 1, further comprising a user interface carried on each vehicle to enable a vehicle operator to select a route to be traveled, a destination, and to perform communications.

10. An automated highway system for controlling the operation of a plurality of vehicles travelling thereon, comprising:
- a plurality of active transponders each carried on a respective one of the vehicles;
- a plurality of transmitters for supplying signals to a transponder carried by one of the vehicles;
- a plurality of receivers for receiving signals produced by the transponder carried by one of the vehicles;
- processing means connected to said plurality of transmitters an to said plurality of receivers, for determining a longitudinal and lateral position of one or more of the vehicles, wherein each of the vehicles includes actuators for controlling vehicle operating parameters, wherein said vehicle operating parameters include steering and speed, and wherein said processing means supplies control signals via said plurality of transmitters to said actuators.

11. An automated highway system as claimed in claim 10, wherein said processing means contains a stored map, and maintains a location of each of the vehicles on said map.

12. An automated highway system as claimed in claim 10, wherein said processing means keeps records of individual ones of the vehicles and schedules maintenance for each vehicle, tests vehicle response to commands, and adjusts vehicle spacing accordingly.

13. An automated highway system as claimed in claim 10, wherein said processing means comprises redundant distributed architecture communicating via a network.

14. An automated highway system as claimed in claim 13, wherein said network has multiple communication modes.

15. An automated highway system as claimed in claim 10, wherein communication between said plurality of transmitters and receivers and with the vehicle transponder is by rf burst transmission.

16. An automated highway system as claimed in claim 10, wherein the vehicle transponders include a transponder processing means for performing communication, decoding and encoding commands, and for controlling the actuators to control the path and velocity of the vehicle.

17. An automated highway system as claimed in claim 16, wherein said transponder processing means is updated at short time periods by said plurality of transmitters, in order to ensure smooth transmissions and mechanically integrated control of steering, acceleration, and braking.

18. An automated highway system as claimed in claim 10, further comprising a user interface carried on each vehicle to enable a vehicle operator to select a route to be traveled, a destination, and to perform communications.

* * * * *